Patented Mar. 27, 1951

2,546,640

UNITED STATES PATENT OFFICE 2,546,640

PRODUCTION OF PHENOL BY OXIDATION OF BENZENE

George Ghislain Joris, Convent, N. J., assignor to Allied Chemical & Dye Corporation, New York, N. Y., a corporation of New York No Drawing. Application September 21, 1948, Serial No. 50,430

9 Claims. (Cl. 260—621)

This invention relates to the oxidation of benzene to phenol by means of elementary oxygen and more particularly to the air oxidation of benzene in vapor phase to phenol.

It is known that passing benzene with a limited amount of air through a zone devoid of catalytic contact masses will yield phenol as a principal oxidation product. U. S. P. 2,223,383 of December 3, 1940 to Moyer and Klingehoefer discloses processes of this sort. Such processes require rather high temperatures to effect appreciable outputs of phenol, for example temperatures from about 550° C. to 650° C.

Increasing the operating pressure for these processes above atmospheric has a tendency to lower the temperature requirement e. g. to about 400° C. at 100 atmospheres pressure; but equipment for operation at increased pressure is expensive and there is danger in operating a hydrocarbon oxidation process above atmospheric pressure because of the increased possibility of leaks from the equipment of poisonous, explosive vapors.

One object of my invention is to promote vapor phase air oxidation of benzene to phenol at temperatures in the vicinity of 300° C. and at pressures of the order of one atmosphere with output comparable to that of prior art processes at like pressures. These new conditions allow more accurate temperature control than in the prior art processes and impose less severe requirements for construction of the oxidation equipment.

Another object is to obtain improved yields of phenol on the aromatic hydrocarbon attacked as compared to the yields by prior art processes.

Still another object is to obtain valuable co-products of oxidation along with the phenol. Other objects and advantages of my invention will appear hereinafter.

In accordance with my improvement in oxidation processes which operate at a pressure of the order of one atmosphere in the vapor phase to convert benzene to phenol by action of elementary oxygen, a reaction temperature within the range of about 250°-400° C. is maintained in the reaction zone, and besides the benzene introduced into the reaction zone there is introduced into the reaction zone from about 1 to about 20 volumes per 100 volumes of benzene of di-n-alkyl ether containing between 2 and 8 carbon atoms in its molecule. By pressure of the order of one atmosphere I mean pressures between about 0.5 and about 5 atmospheres (absolute). Volume ratios given herein refer to volumes of the materials in vapor state.

The introduction of said di-n-alkyl ether in quantities within the specified ranges with total pressures of the order of one atmosphere results, I have found, in the appearance of a temperature range with lower limit about 250° C. and upper limit about 400° C. within which comparatively rapid oxidation of the benzene and the ether occurs to form phenol and products of incomplete oxidation of the ether plus some carbon oxides and other products. Below about 250° C. the reaction rate is small. The temperature of most rapid reaction within the temperature range employed in my process is normally about 280°-320° C., but may be lower at very low space velocities as discussed below. Above about 320° C. the reaction rate drops, more or less sharply depending on what ether is used, on space velocity, and on concentration of the ether. At temperatures above about 450° C. (i. e. above the temperature range of my process) the reaction rate once more rises with increasing temperature and at about 500° C. (in the presence of the promoters) oxidation of the reaction mixture again is rapid.

The ether itself as well as the benzene is in part oxidized forming in addition to carbon oxides valuable compounds such as formic acid, formaldehyde and methanol. These compounds can be separated from the other products and recovered.

Among suitable ethers for use in my process are for example dimethyl ether, diethyl ether, ethyl methyl ether, di-n-propyl ether, di-n-butyl ether, methyl-n-propyl ether, ethyl-n-propyl ether, and ethyl-n-hexyl ether. Ethers containing not more than 4 carbon atoms are preferred both because of their activity and because they form relatively few different oxidation products.

The quantity of ether present should be sufficient to bring about the oxidation of substantial amounts of benzene in one pass of the reaction mixture through the reaction zone. This requires a minimum of about 1 volume of ether per 100 volumes of benzene in the reaction mixture. If the quantities of ether present are small the quantity of phenol appearing in the liquid product of one pass depends linearly on the volumes of ether introduced per 100 volumes of input benzene. With dimethyl ether promoter the linear portion of the curve expressing the weight percent of phenol in the liquid products per pass vs. promoter concentration extends up to about a 10:90 input volume ratio of ether:benzene in the reaction mixture. Above this ratio the weight percent of phenol found in the liquid products after one pass goes up less than linearly with increasing ether:benzene ratios. Preferred volume ratios for ether:benzene are about 5:100–10:100. An input volume ratio of either: benzene of about 20:100 represents a suitable upper limit for ether concentration in my process.

I believe that the above-described low temperature oxidation range from about 250°–400° C. within which my process operates is associated with peroxide formation from the ether; and that the falling off in oxidation rate with increasing temperatures observed between about 320° C. and about 450° C. is associated with acceleration of processes in which decomposition of the peroxides is faster than their reaction with benzene. The high temperature oxidation occurring from about 450° C. up appears due to a reaction distinct from that occurring in the temperature region below about 400° C., used in my process.

The examples which follow are to be understood as illustrative of the invention but not as limiting the scope of the invention:

*Example 1.*—A metered flow of air saturated with benzene by bubbling the air through a container of benzene maintained at constant temperature was mixed with a metered flow of dimethyl ether and passed down a heated Pyrex glass tube of 2" O. D. and 4' length at a space velocity of input gases and vapors (STP), based on the total volume of the tube, of 150 reciprocal hours. The first foot of the tube functioned as a preheater section. Temperatures were measured by a series of thermocouples down the tube. The temperature recorded below as reaction temperature is the temperature maintained in the hottest zone of the reactor. The exit gases were passed first through a trap at about 150° C. to remove tars, then through two scrubbing towers packed with stainless steel helices. The first tower was kept at about 50°–65° C. to condense some of the unreacted benzene which refluxed, removing phenol and other relatively involatile products from the product gases. This benzene solution of phenol was further concentrated by dripping into the head of a small packed column countercurrent to a flow of dry gas bled off from the exit gases.

The gases still containing some benzene entered the second scrubbing tower which was cooled with circulating ice water. An organic layer and an aqueous layer collected at the bottom of the tower; the organic layer was recirculated to the benzene evaporator.

The gases leaving the second tower were passed through charcoal traps to adsorb residual materials such as benzene; the gases leaving the charcoal traps were sampled for analysis regularly during the run and a portion was continuously collected for analysis by displacement of water in a storage bottle. The charcoal traps were periodically heated in a stream of nitrogen and the gas, containing desorbed materials, was passed to the benzene evaporator.

The quantities of all products collected were measured. The phenolic product was analyzed for phenol by bromination to tribromophenol. The aqueous products collected in the second tower were analysed for acid and aldehyde content; and the benzene collected in the second tower and in the benzene saturator at the end of the run was measured. The dimethyl ether unconsumed at the end of the run was determined by absorption of dimethyl ether from the exit gases in a saturated zinc chloride solution.

The input volume ratio of air:benzene vapor in the above run was 1.0; the input volume ratio of dimethyl ether:benzene vapors was 5:95; the reaction temperature was 300° C.; and the duration of the run was 30 hours.

The weight of benzene attacked per part by weight of phenol produced was 1.36 parts and the weight of dimethyl ether attacked on the same basis was 1.56 parts. The weight of oxygen consumed was 2.36 parts per part by weight of phenol produced.

The weight of aqueous products formed in this run and collected in the second tower amounted to 2.47 parts per part by weight of phenol produced. These products contained 0.80 part of formic acid and 0.38 part of formaldehyde per part by weight of phenol produced. The weight of sulfonatable product collected in the second tower and benzene saturator per part phenol produced was 0.13 part; the weight of tar was 0.22 part; and the weight of non-phenolic material collected along with phenol was 0.23 part. The weight of carbon monoxide produced was 1 part per part by weight of phenol formed and the weight of carbon dioxide on the same basis was 0.26 part.

The benzene attacked in the above example amounts to about 2% of the benzene circulated to the reaction zone during the reaction period. The phenol formed amounts to 61% of the theoretical based on the benzene attacked. The carbon oxides formed are about 24% of theory based on the benzene and dimethyl ether attacked.

*Example 2.*—A metered flow of air saturated with benzene was mixed with a metered flow of diethyl ether and the mixture was introduced into the same apparatus as described in Example 1. The technique of separation of the products of reaction was also similar.

The input volume ratio of air:benzene vapor was 1.0; the input volume ratio of diethyl ether: benzene was 2.5:97.5; the temperature of reaction was 280° C.; the space velocity was 150 (hr.$^{-1}$).

The conversion of benzene to phenol per pass was 1.66 parts of phenol per 100 parts of benzene treated. About 2.2 parts of benzene was consumed per 100 parts treated.

The weight of aqueous products formed in this run and collected in the second tower amounted to 2.0 parts per part by weight of phenol produced. These products contained 0.09 part of formic acid, 0.23 part of acetic acid, 0.2 part of formaldehyde and 0.13 part of acetaldehyde per part by weight of phenol produced.

The weight of diethyl ether consumed to produce one pound of phenol is about one pound.

The weight of carbon monoxide produced was about 1 part per part by weight of phenol formed and the weight of carbon dioxide on the same basis was 0.25 part.

Di-n-butyl ether when substituted for dimethyl or diethyl ether in the procedures of the above examples promotes the oxidation of benzene to phenol in a similar manner, but is less active than the ethers shown in the examples.

The amount of tar formed in the above examples can be reduced and the phenol yield increased by employing expedients such as very quick cooling of the vapors leaving the reactor.

Variables in my process such as ratio of air: hydrocarbon and space velocity may be within the ranges previously known for processes in which benzene is oxidized to phenol. Particularly suitable values for these variables are noted below.

Particularly suitable input volume ratios of air:organic reactants may range from about 5:1–1:5. Preferably a ratio of 1:1 to 1:3 is employed since this ratio allows a satisfactory level of phenol output accompanied by a low value for the mols of carbon oxides produced per mol of phenol formed.

Space velocities of input gases and vapors (STP), based on the total volume of the reactor, are suitably at least about 20 reciprocal hours. Space velocities of about 75–300 reciprocal hours are especially suitable since these space velocities are conveniently obtained and lead to satisfactory levels of phenol output. A space velocity of about 100–150 reciprocal hours represents the preferred value in this range.

The space velocity employed determines, within limits, the value for the temperature giving maximum output of phenol per pass. Thus at space velocities as low as about 20 per hour, the temperatures giving maximum outputs are about 255°–265° C., whereas at space velocities of about 100 per hour or more, maximum outputs per pass are obtained at about 300–320° C. The higher the space velocity, the sharper is the peak found in the curve of phenol output per pass vs. temperature.

The apparatus used to carry out my process may be constructed in accordance with previously known construction of apparatus for exothermic vapor phase oxidation processes employing as oxidizing agent a gas, such as air, containing elementary oxygen. The construction materials may be chosen from those previously known for vapor phase air oxidation of aromatic hydrocarbons to phenols. Thus the reaction zone may be constructed of or lined with for example glass, boron oxide or aluminum.

Preferably the apparatus provides for recycling unreacted benzene and promoter back to the reaction zone. The recycled material may contain partial oxidation products dissolved therein. The benzene employed need not be pure; it may contain for example aliphatic and/or alicyclic hydrocarbons.

Preferably provision is made for recovering other products, e. g. products obtained from the promoter, as well as for recovering phenol. For example, a water extraction of the crude phenolic product followed by benzene extraction of the aqueous phenol solution may be used to separate phenol from other products and to recover these products. The benzene solution of phenol resulting may then be distilled to recover pure phenol therefrom without substantial loss due to formation of tars during the distillation process.

I claim:

1. In a process for oxidizing benzene to phenol in vapor phase at pressures of the order of one atmosphere with elementary oxygen, the improvement which comprises introducing into the reaction zone benzene, oxygen, and from about 1 to about 20 volumes (as vapor, per 100 volumes of benzene vapor introduced into the reaction zone) of di-n-alkyl ether containing between 2 and 8 carbon atoms in its molecule; and maintaining reaction temperatures in the hottest zone of the reactor in the range from about 250° C. to about 400° C.

2. A process in accordance with claim 1 in which the space velocity of the input gases and vapors (STP) is at least about 20 volumes of vapors per hour per unit volume in the reactor.

3. A process in accordance with claim 1 in which phenol is separated from other products by a water extraction of the crude phenolic product followed by a benzene extraction of the resulting aqueous phenol solution.

4. A process in accordance with claim 1 in which the ether is an ether containing not more than 4 carbon atoms in its molecule.

5. A process in accordance with claim 4 in which the oxygen employed is oxygen of the air and the input volume ratio of air:organic reactants in vapor state is within the range 5:1–1:5.

6. A process in accordance with claim 5 in which the reaction temperatures are within the range of about 280°–320° C. and the space velocities of input gases and vapors (STP) are between about 75 and 300 volumes of vapors per hour per unit volume in the reactor.

7. A process in accordance with claim 6 in which the ether is dimethyl ether.

8. A process in accordance with claim 7 in which the ether is introduced in an input volume ratio of ether vapor:benzene vapor between about 5:100 and about 10:100, the input volume ratio of air:benzene vapor is between about 1:1 and about 1:3, the reaction temperatures are within the range of about 280°–320° C. and the space velocity of the input gases and vapors (STP) is between about 100 and about 150 reciprocal hours.

9. A process in accordance with claim 6 in which the ether is diethyl ether.

GEORGE GHISLAIN JORIS.

REFERENCES CITED

The following references are of record in the file of this patent:

UNITED STATES PATENTS

| Number | Name | Date |
|---|---|---|
| 2,137,587 | Poffenberger | Nov. 22, 1938 |
| 2,415,101 | Krieble et al. | Feb. 4, 1947 |
| 2,439,812 | Krieble et al. | Apr. 20, 1948 |
| 2,440,233 | Krieble et al. | Apr. 20, 1948 |
| 2,440,234 | Krieble et al. | Apr. 20, 1948 |